3,720,249
TREE HARVESTING SHEAR
Ahti Peltonen, Reesor, Ontario, Canada, assignor to Eaton Yale & Towne Canada Limited, London, Ontario, Canada
Filed Mar. 12, 1971, Ser. No. 123,649
Int. Cl. A01g 23/08
U.S. Cl. 144—309 AC          7 Claims

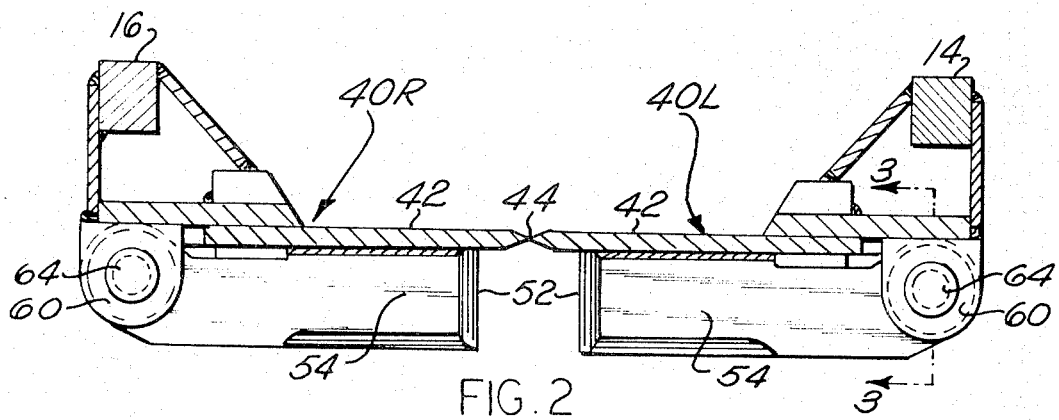
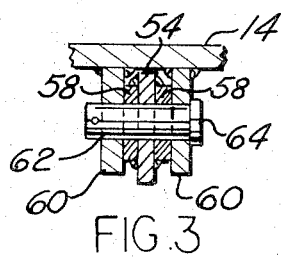
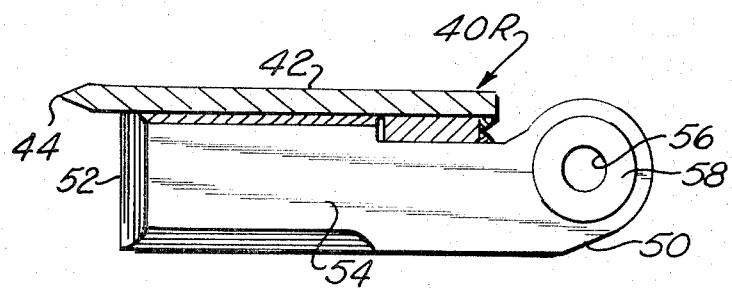
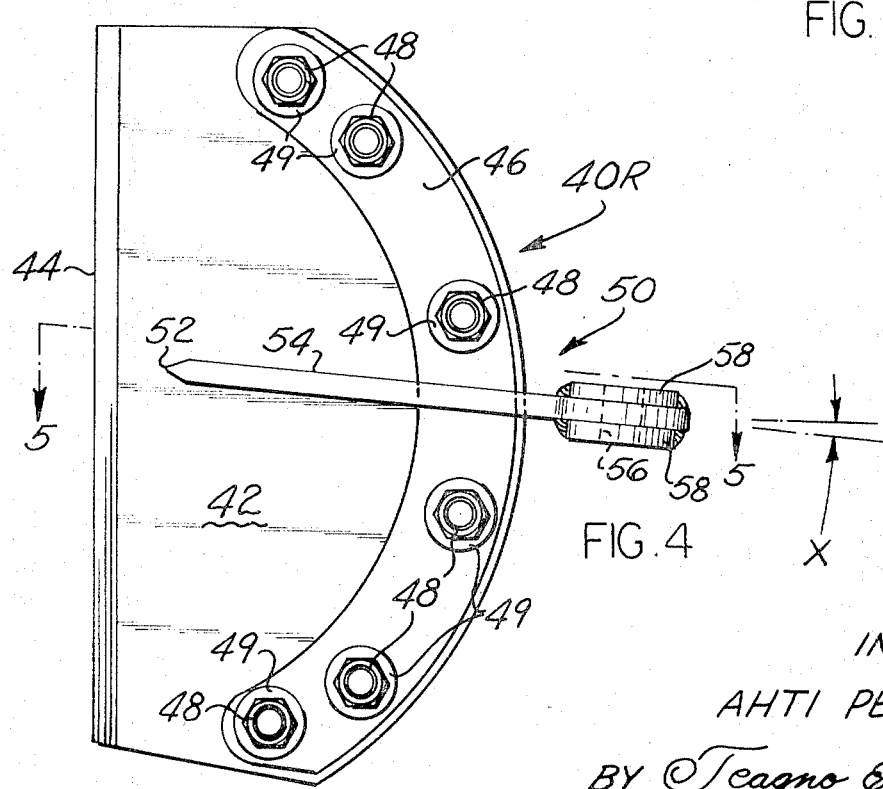
INVENTOR
AHTI PELTONEN
BY Teagno & Toddy
ATTORNEYS INVENTOR
AHTI PELTONEN
BY Tcagno & Toddy
ATTORNEYS

United States Patent Office 3,720,249
Patented Mar. 13, 1973

ABSTRACT OF THE DISCLOSURE

A blade for a tree harvesting mechanism includes a first cutting edge disposed in a generally horizontal plane and a second cutting edge disposed in generally vertical plane immediately below said first cutting edge. The second cutting edge thereby being effective to split the stump of said tree simultaneously as said first cutting edge shears the trunk of said tree.

BACKGROUND OF THE INVENTION

(1) Field of the invention

This invention relates to a novel blade structure for a tree felling mechanism of the type in which a standing tree is felled by passing a shear blade through the trunk thereof.

(2) Discussion of the prior art

Tree felling mechanisms are generally well known in the art as is evidenced by the following U.S. Letters Patents: 3,183,954 issued May 19, 1965 to Larson; 3,327,-745 issued June 27, 1967 to Meece et al.; and 3,382,899 issued May 14, 1968 to White.

These tree shearing devices were conceived for the purpose of providing a method of rapidly felling trees and harvesting timber to thereby increase profitability in the logging industry over conventional manual sawing methods of felling trees. Although these shearing devices do provide a means of rapidly felling trees, the quality of the cut at the butt end of the log is, in many instances, much inferior to the butt end produced by conventional saw felling. This is because the butt end of the felled tree is severely splintered by the shearing forces. This splintering and consequent reduced quality results in a lower price for trees felled with a shearing mechanism over the same trees felled by other conventional means such as sawing. However, the rapidity and economy of the shearing operation more than offsets the reduction in price due to lower quality butt ends of the logs and thus actually increases profitability of the logging operation.

Another problem of the prior art devices is that due to the tremendous forces involved in the shearing operation, the shear blades are sometimes subject to extreme deflection and resultant failure. In addition, any deflection of the shear blade even further reduces the quality of the butt end of the log because of the uneven cut, thereby even further reducing the value of the felled tree.

Compounding the problem of blade deflection is the climate in which many lumbering operations take place. Many logging operations take place in Northern Canada where temperatures often reach 40 degrees below zero during the winter. Under these conditions, the tree is frozen into a solid, rock-like mass which resists shearing by even the strongest of the prior art shear blades. Indeed, under these conditions, blade deflections of 8 inches and more have been observed. The importance of eliminating splintering from the butt of the log will be put in proper focus by the knowledge that an increase of approximately 2 inches of additional usable wood from each tree severed, over the life of a timber harvesting machine, will more than pay for the cost of the machines.

SUMMARY OF THE INVENTION

Accordingly, it is an object of this invention to provide a novel tree felling shear mechanism which includes structure for producing a clean cut on the butt end of the log.

Another object of this invention is to provide a new and novel shear blade for use in a tree felling apparatus and wherein said shear blade is much more rigid than prior art devices.

A further object of this invention is to provide a novel method of felling trees in a timber harvesting operation by simultaneously shearing said tree horizontally and making a vertical shear below said horizontal shear, wherein said method results in a cleaner cut on the butt end of the log and thereby produces more usable wood from each tree felled utilizing the method.

The invention includes a novel shear blade having a first cutting edge disposed in a horizontal plane and a second cutting edge disposed immediately below and generally perpendicular to the first cutting edge. As the first cutting edge severs the usable trunk of the tree from the unusable stump, the second cutting edge simultaneously enters the stump, thereby splitting the stump and causing substantially all splintering to occur in the unusable stump rather than in the butt end of the log.

BRIEF DESCRIPTION OF THE DRAWING

FIG. 2 is a sectional view taken along the lines 2—2 of FIG. 1 and showing the shear blade of the instant application in greater detail.

FIG. 3 is a sectional view taken along the lines 3—3 of FIG. 2, showing a mounting connection for the blade of the instant application.

FIG. 4 is a detailed bottom view of the shear blade of the instant application showing the construction thereof in greater detail.

FIG. 5 is a sectional view taken along the lines 5—5 of FIG. 4.

DESCRIPTION OF THE PREFERRED EMBODIMENT

Figure 1:
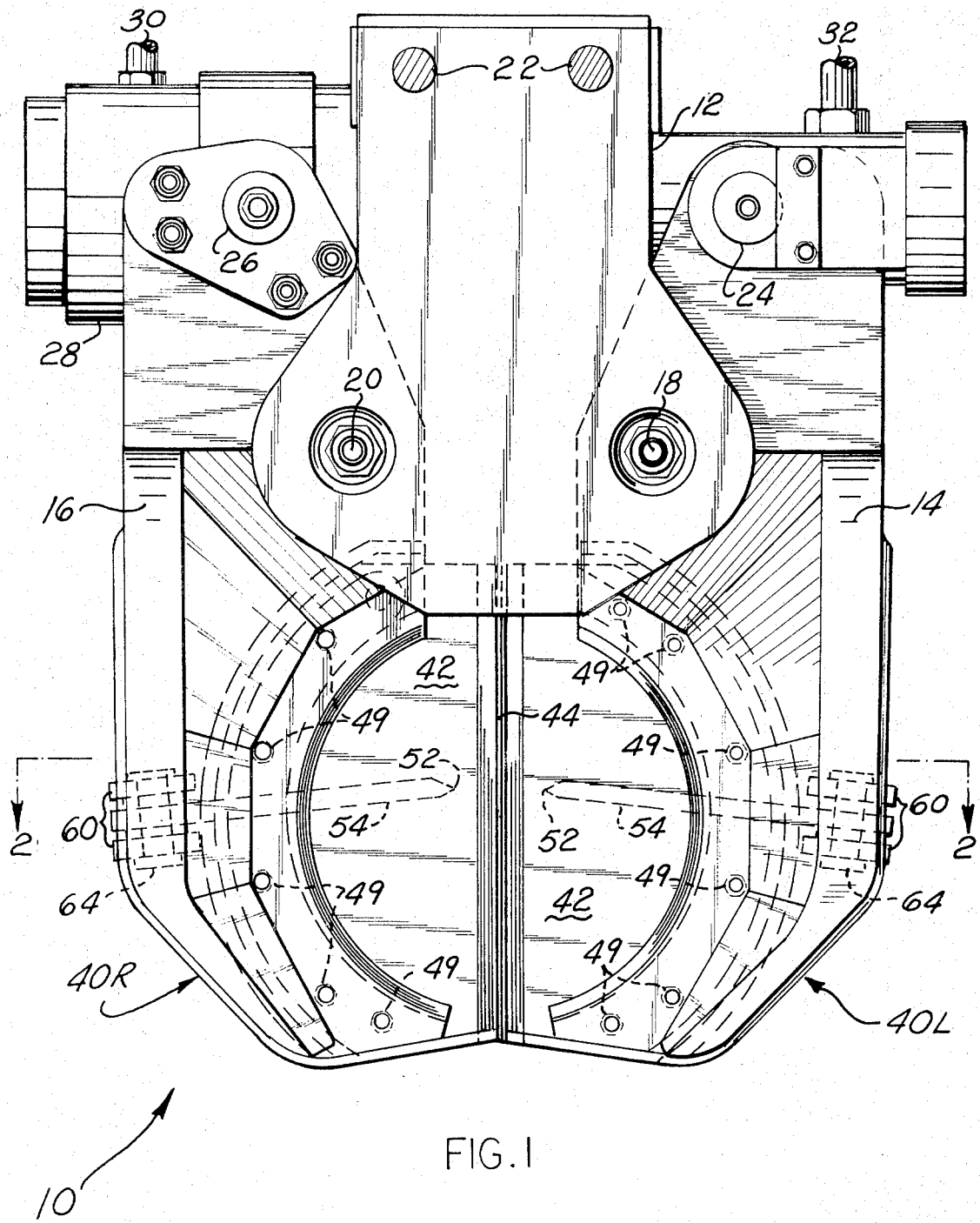
FIG. 1 is a plan view of a tree shearing mechanism utilizing the shear blade of the instant application.

Referring now to FIG. 1, wherein there is shown a timber harvesting apparatus 10 having a frame 12 with a pair of arms 14, 16 pivotally mounted thereon by means of pivot pins 18 and 20 respectively. The frame 12 further includes means in the form of mounting holes 22 for attaching the timber harvesting apparatus 10 to a mobile tractor or the like (not shown). Mounted within the frame and operably connected to the arms 14, 16 by means of a pair of pins 24, 26 respectively is a hydraulic cylinder 28 containing a piston (not shown). The hydraulic cylinder 28 is of conventional design and is adapted to a hydraulic system of the tractor (not shown) on which the timber harvesting apparatus 10 is mounted. This adaptation is provided by means of a pair of hydraulic fittings 30 and 32 disposed at opposite ends of the hydraulic cylinder 28 as shown in FIG. 1. Attached to the ends of each arms 14, 16 are novel shear blades 40L and 40R respectively. Shear blades 40R and 40L are right hand and left hand blades respectively, therefore further description will only be made with reference to blade 40R.

Construction and operation of the hydraulic cylinder and its connection to the tractor are well known in the art, consequently further description of this portion of the shearing mechanism is not necessary; suffice it to say that as pressurized hydraulic fluid enters connection 30 of the hydraulic cylinder 28, the pins 24, 26 are forced apart and as pressurized hydraulic fluid enters the other connection 32, the pins 24, 26 are forced closer together, the purpose of which will become more apparent from the description which follows hereinafter.

Direction of hydraulic fluid flow is controlled by a standard hydraulic valve on the tractor (not shown). Further details on mounting and operation of the shearing mechanism of the instant application are given in United States Letters Patent application Ser. No. 888,746 filed Dec. 29, 1969 and assigned to assignee of the instant invention, and the specification of that application is hereby incorporated by reference into the instant application.

From the foregoing, it should now be readily understood that the shearing mechanism to this point is of a rather conventional design and thus will be readily understood by one of ordinary skill in the art.

By reference to FIG. 4, the shear blade 40R comprises a first plate member 42 having a first cutting edge 44 disposed thereon. The shear blade 40R further includes an arcuate member 46 having holes 48 for receiving bolts or fasteners 49 (as shown in FIGS. 1 and 4) to mount the shear blade 40 relative to the arm 14 or 16. The bolts 49 are positioned in an arcuate manner specifically to resist horizontal shearing forces during operation. Mounted on the underside of the first plate member 42 and generally perpendicular thereto is a second plate member 50.

The second plate member 50 is rigidly attached to first plate member 42 and includes a sharpened edge 52 at one end thereof. It should be noted that the vertical sharpened edge 52 is slightly behind or trailing the first cutting edge 44 of horizontal plate member 42. The second plate member 50 further includes a body portion 54 having a mounting aperture 56 in an end thereof opposite the sharpened edge 52. The area of plate member 50 surrounding aperture 56 is reinforced by disc shaped member 58 welded to either side thereof.

As shown in FIG. 3, arms 14 or 16 are further provided with a pair of spaced apart ears 60 welded to the underside for receiving the reinforced end portion thereof of second blade member 50. The ears 60 have an aperture 62 therethrough for receiving a pin 64.

Depending upon local conditions and the types of trees to be felled, it may be advantageous to dispose plate member 50 at an acute angle X with respect to normal from the cutting edge 44, as shown in FIG. 4, in order to achieve the necessary degree of shattering of the stump to insure proper felling of the trees.

The aforementioned pin connection arrangement as shown in FIG. 3, when combined with the bolt connections through apertures 48 as previously discussed, provides an extremely rigid connection of the blade member 40 to the arm 14 or 16 on which it is mounted. This is because the pin connection is spaced from the plane of shearing forces, thereby providing a moment arm for allowing pin 64 to more effectively resist the vertical deflection forces in plate member 42 caused by the shearing action.

DESCRIPTION OF OPERATION

Figure 6:
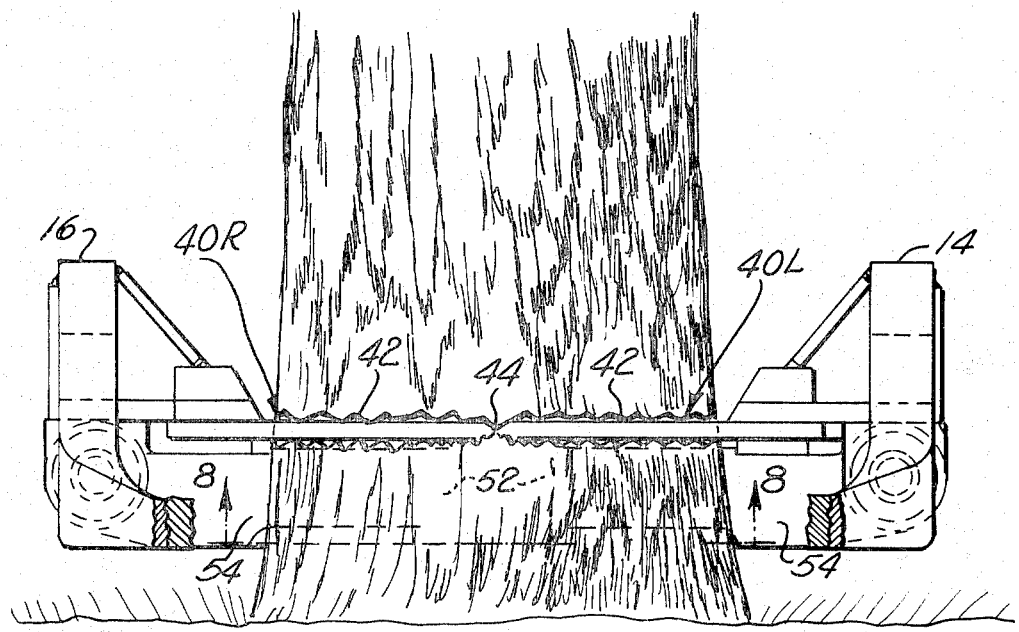
FIG. 6 is a view showing the shear blades of the instant invention shearing a tree.

During operation of the timber harvesting apparatus 10, the hydraulic cylinder 28 is operated so as to bring pins 24, 26 closer together thereby pivoting arms 14 and 16 about pivot pins 18 and 20 respectively and opening the shear in order to receive a tree (as shown in FIG. 6) between the blades 40R and 40L thereof. When the tree is between shear blades 40R, 40L, reversal of the hydraulic cylinder pressure causes pins 24, 26 to separate which results in pivoting of arms 14, 16 toward the closed position about pivot pins 18 and 20 respectively, thereby causing the shear blades 40R and 40L to sever the tree from its stump. During this closing operation, the first or horizontal cutting edges 44 engage the trunk of the tree and begin the shearing operation. As these cutting edges penetrate the tree, cutting edges 52 of blade members 50 engage the stump of the tree and begin to split and shatter the stump of the tree thereby bending and separating the wood fibers in the stump of the tree and providing for cleaner and easier shearing by the blade member 44.

Figure 7:
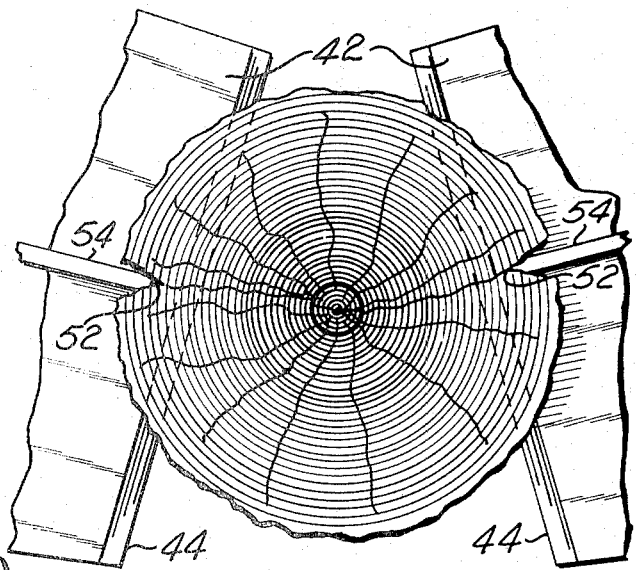
FIG. 7 is an enlarged cross-sectional view taken along lines 7—7 of FIG. 6 showing the shear blades of the instant application initially entering the trunk of a tree.
Figure 8:
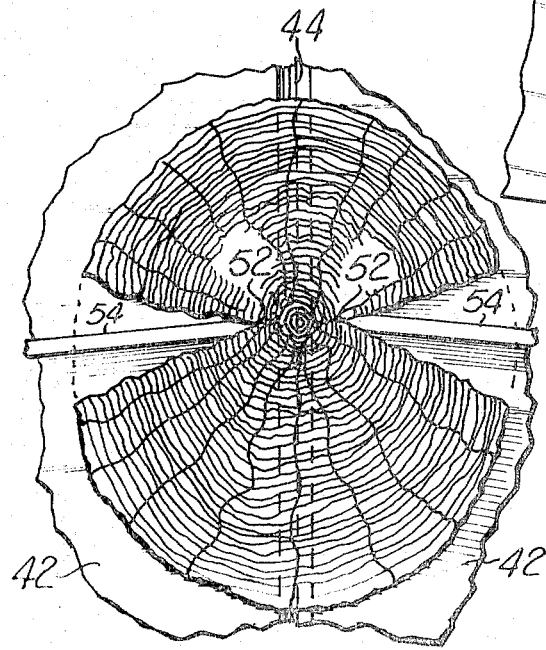
FIG. 8 is a view similar to FIG. 7 showing the positions of the shearing blades relative to the stump of the tree at the completion of a shearing operation.

As can be seen from FIG. 7, as cutting edges 52 penetrate the stump of the tree, the stump begins to split and separate. By reference to FIG. 8, it will be seen that because of the complex arcuate motion of the body 54 of blade members 50, the wood fibers of the unusable stump are totally shattered and separated thereby relieving stresses from the usable trunk of the tree during the cutting operation and considerably improving the quality of the butt end of the cut log. From the foregoing, it should be readily understood that at the conclusion of the shearing operation, the stump of the tree is almost totally destroyed by being shattered and torn by the blade members 54 while the butt end of the log remains unsplintered and presents a neat clean cut appearance which results in a higher price for the log and more good usable wood for each tree cut with the aforementioned timber harvesting mechanism.

I now claim:
1. A method of felling trees comprising:
moving a horizontal shear blade through said tree; and simultaneously therewith,
moving a vertical shear blade along an arcuate path into the tree immediately adjacent and below the horizontal shear blade as the trunk of said tree is severed therefrom to shatter the stump of said tree.
2. Tree felling apparatus comprising:
a frame,
a cutting blade,
means mounting said cutting blade on the frame for movement relative thereto into cutting engagement with a tree,
said cutting blade having a cutting member including a first generally horizontal cutting edge and a second generally vertical cutting edge,
the second cutting edge being located below the first cutting edge, and
means for moving the blade relative to the frame and into engagement with said tree.
3. The tree felling apparatus of claim 2 wherein said means mounting said cutting blade comprises:
an arm pivotally mounted on said frame, and
means for attaching said cutting blade to said arm including a primary connection and a secondary connection,
said primary connection being positioned for resisting the horizontal shearing forces resulting from engagement of said cutting member with said tree and said secondary connection being spaced from said primary connection for resisting vertical deflection forces in said cutting member resulting from engagement of said cutting member with said tree.
4. The tree felling apparatus of claim 3 wherein said primary connection comprises a plurality of fasteners passing through both said arm and said cutting blade generally perpendicular to the plane of said horizontal cutting edge,
and said secondary connection comprises a pin or the like passing through both said arm and said cutting blade generally parallel to but spaced from the plane of said horizontal cutting edge.
5. In tree felling apparatus including a shear blade adapted to be mounted for movement on a tree felling attachment of a vehicle having means for moving said blade under power horizontally through the trunk of a tree for severing said tree from its stump, the improvement which comprises:
   a second cutting member disposed in a substantially vertical plane and mounted on and below said first cutting member to penetrate the stump of said tree along an arcuate path, as said first cutting member moves through the trunk of said tree.

6. A tree shearing apparatus comprising:
   a frame,
   a pair of arms pivotally mounted on the frame, and pivotal between an open and a closed position;
   a shear blade having a first generally horizontal cutting edge and a second generally vertical cutting edge mounted on at least one of the arms for movement therewith between said open and closed positions, and
   means for moving said arms between said open and closed positions.

7. The tree shearing apparatus of claim 6 wherein the shear blade comprises:
   a first plate member extending in a generally horizontal direction and including said first cutting edge, and
   a second plate member including said second cutting edge, mounted on and below said first plate member and extending generally perpendicular to said first cutting edge.

References Cited
UNITED STATES PATENTS

| | | | |
|---|---|---|---|
| 3,330,314 | 7/1967 | Dickson | 144—34 F |
| 2,821,217 | 1/1958 | Shald | 144—34 F |

GERALD A. DOST, Primary Examiner

U.S. Cl. X.R.

144—34 E

PO-1050
(5/69)

UNITED STATES PATENT OFFICE
CERTIFICATE OF CORRECTION

Patent No. 3,720,249      Dated March 13, 1974

Inventor(s) A. Peltonen

It is certified that error appears in the above-identified patent and that said Letters Patent are hereby corrected as shown below:

Col. 5, line 4:      after "comprises:" insert ---said shear blade having a first cutting member disposed in a substantially horizontal plane, and---.

Col. 5, line 8:      change "path," to ---path---.

Signed and sealed this 3rd day of December 1974.

(SEAL)
Attest:

McCOY M. GIBSON JR.
Attesting Officer

C. MARSHALL DANN
Commissioner of Patents